United States Patent [19]

Posnansky et al.

[11] 4,095,369
[45] Jun. 20, 1978

[54] INSTALLATION FOR CULTIVATING PLANT CULTURES

[76] Inventors: Mario Posnansky, Pappelweg 4, 3072 Ostermundigen (Canton of Berne); Bernardo Raimann, Hegibergstrasse 78, 4632 Trimbach (Canton of Soleure), both of Switzerland

[21] Appl. No.: 779,628

[22] Filed: Mar. 21, 1977

[30] Foreign Application Priority Data

Mar. 24, 1976 Switzerland .................. 3661/76

[51] Int. Cl.² ............................................ A01G 13/00
[52] U.S. Cl. ........................................ 47/26; 47/17; 237/1 A
[58] Field of Search ................ 47/17, 26; 126/270, 126/271; 237/1 A

[56] References Cited

U.S. PATENT DOCUMENTS

| 3,847,136 | 11/1974 | Salvail | 126/271 |
| 4,020,989 | 5/1977 | Kautz | 237/1 A |
| 4,026,269 | 5/1977 | Stelzer | 126/270 |
| 4,027,653 | 6/1977 | Meckler | 126/271 |

FOREIGN PATENT DOCUMENTS

| 38,132 | 9/1970 | Australia | 47/17 |
| 2,269,038 | 4/1974 | France | 126/271 |
| 840,926 | 1/1939 | France | 126/271 |
| 84,769 | 9/1971 | Germany | 47/17 |

OTHER PUBLICATIONS

"Skylid," Components for Solar Energy Systems Catalogue, p. 13, 1975, Refrigeration Research Inc.

Primary Examiner—E. H. Eickholt
Attorney, Agent, or Firm—Werner W. Kleeman

[57] ABSTRACT

An installation for cultivating plant cultures comprising a cover device for protecting the ground at which the plants are grown from damaging radiation of the sun, and a support device for supporting the cover device. The cover device comprises a number of pivotable, substantially cylindrical parabolic reflectors. Along the focal lines of these parabolic reflectors there is arranged a respective conduit for conveying a heat carrier. An adjustment mechanism pivots the reflectors about their lengthwise axis. A circulation system for the heat carrier is provided and encompasses a conveyor or feed pump and the aforementioned conduits. A control device actuates the adjustment mechanism and is structured such that when the sun is shining the reflectors are automatically positionally adjusted in accordance with the position of the sun and at the same time the ground is shaded and the energy of the sun absorbed by the reflectors is removed.

9 Claims, 8 Drawing Figures

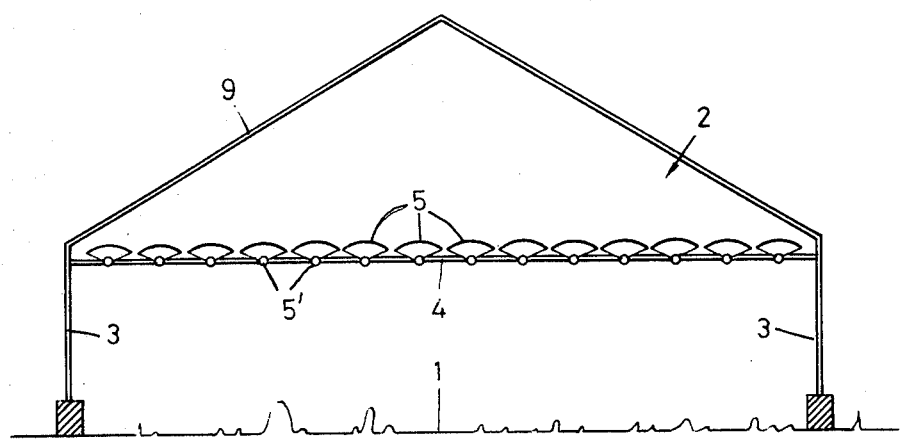
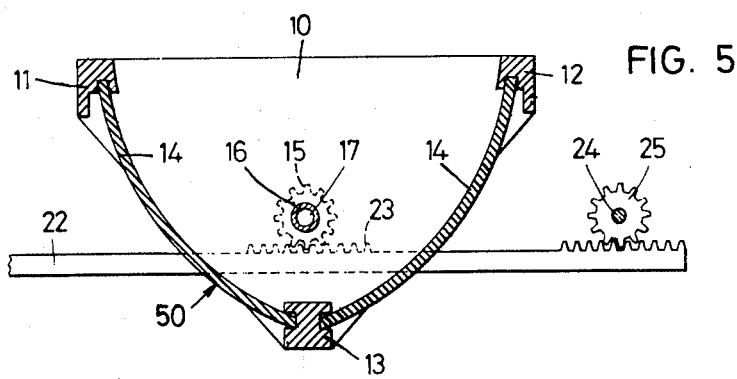
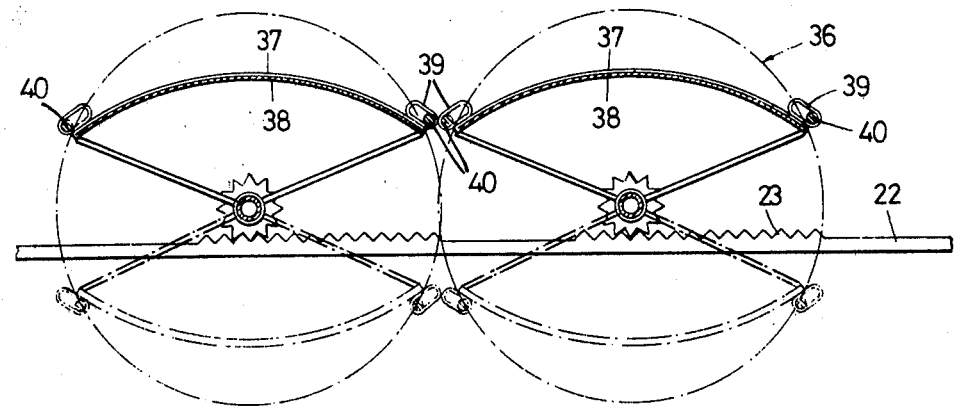

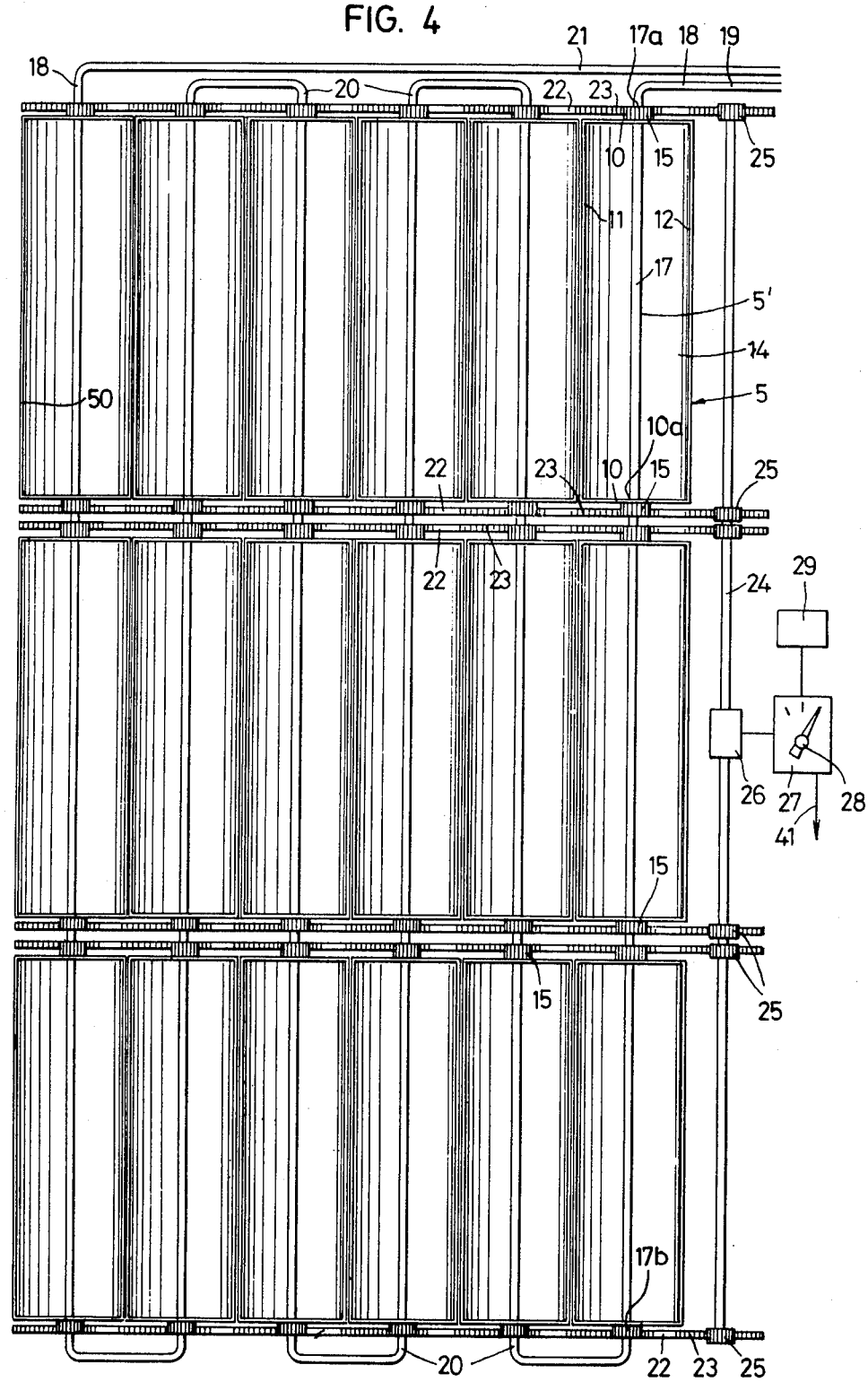

INSTALLATION FOR CULTIVATING PLANT CULTURES

BACKGROUND OF THE INVENTION

The present invention relates to a new and improved construction of installation for growing or cultivating plant cultures which is of the type comprising a cover device for protecting the ground or surface at which the plants are grown from damaging effects of the radiation of the sun, there also being provided a support device for supporting the cover device.

In order to cultivate plant cultures it is known to use so-called greenhouses in order to grow plants therein independent of the external climatic conditions. As the covering material it is known to use glass or plastic in order, on the one hand, to make maximum use of the visible radiation spectrum for photosynthesis, to utilize the long wave radiation range as thermal energy by means of the so-called "Glass house effect" and, on the other hand, in the presence of low external temperatures to obtain with the aid of heating devices the room temperature needed for reproduction of the plants. However, during those hours of the day that the sun is extremely intensive it is possible for the room or ambient temperature to climb to such an extent and for the radiation intensity to increase such, that the plants wither or decay. For the purpose of preventing a too pronounced temperature increase prior art greenhouses have mounted at the ridge of the roof and partially also at the vertical walls air flaps or valves, in order to be able to withdraw to the outside as much of the excess heat as possible. Further prior art measures contemplate applying a color coating to the outside of the glass during those months that the sun is most intensive, in order to reduce the radiation of the sun, or mounting within or externally of the greenhouse mechanically movable shades formed of fabric webs for the purpose of preventing direct impingement of the radiation of the sun upon the plants. Additionally, there have already also been proposed to the art devices by means of which absorption of the rays of the sun is accomplished by a colored or dyed liquid which is conveyed between transparent walls. Such type device has been disclosed, for instance, in German Pat. No. 2,522,791. The heat absorbed by the liquid can be stored and then used during the night for heating purposes.

The state-of-the-art greenhouses must be heated at the expense of considerable thermal energy especially during the nighttime when there is not available the radiation of the sun. In order to avoid excessive thermal losses it is known to mount thermal insulation material beneath the outer skin or wall of the greenhouses.

Certain types of plants require so-called artificial "short or abbreviated days" to achieve as short as possible and optimum growth time. For this purpose it is already known to install devices in the greenhouses which enable darkening the interior space or area. To heat the prior art greenhouses there are utilized conduit systems, heating bodies or air heaters which are connected to a boiler.

The heretofore known ventilation devices are only adequately effective to a limited extent in a number of instances in the presence of high external temperatures if there are not installed additional cooling devices. The prior art technique of shading the greeenhouse with the aid of a color coat applied to the outside of such greenhouse is associated with the drawback that during those times when there is relatively little light, especially on extremely cloudy days, the light which promotes growth of the plants is absorbed or reflected before it reaches the plants. Further, the prior art technique of mounting shades formed of fabric webs at the outside or inside of the greenhouse requires relatively expensive installations, which in addition to the usual devices requires the performance of expensive maintenance work to be carried out at regular intervals. The heretofore known means for the reduction of the thermal requirements of greenhouses are fixedly mounted and absorb or reflect the light and thus reduce the value of the enclosed space for plant cultivation. When employing movable thermal insulation there are required expensive mechanical devices, which apart from the high investment costs also are associated with equally great maintenance costs.

SUMMARY OF THE INVENTION

Hence, it is a primary object of the present invention to provide a new and improved construction of installation for the cultivation of plant cultures which is not associated with the aforementioned drawbacks and limitations of the prior art constructions.

Another and more specific object of the present invention aims at a new and improved construction of installation for cultivating plants which is relatively simple in construction and design, relatively economical to manufacture, requires very little maintenance and servicing, and is extremely effective for the controlled growth of plants.

Now in order to implement these and still further objects of the invention which will become more readily apparent as the description proceeds, the invention contemplates that the cover device embodies a number of pivotable, substantially cylindrical parabolic reflectors. Along the focal line of each parabolic reflector there is arranged a respective conduit or pipe for conveying a heat carrier. An adjustment mechanism serves to pivot the reflectors about their lengthwise axis and there is also provided a circulation system for the heat carrier which embodies a conveyor or feed pump and the aforementioned conduits. A control device serves to actuate the adjustment mechanism. The control device is constructed such that when the sun is shining the reflectors automatically follow the position or altitude of the sun, and at the same time the ground is shaded and the energy of the sun which is absorbed or taken-up by the reflectors is removed.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 3 illustrates a modified construction of installation from that shown in FIG. 1 and having a roof formed of a light pervious material;

FIG. 4 is a top plan view of a cover device employed in the installation according to FIG. 1 and constructed of a number of cylindrical parabolic reflectors;

FIG. 5 is a cross-sectional view through one of the reflectors shown in the arrangement of FIG. 4;

FIG. 6 is a schematic side view of two reflectors of simplified construction;

DETAILED DESCRIPTION OF THE PREFERRED EMBODIMENTS

Figure 1:
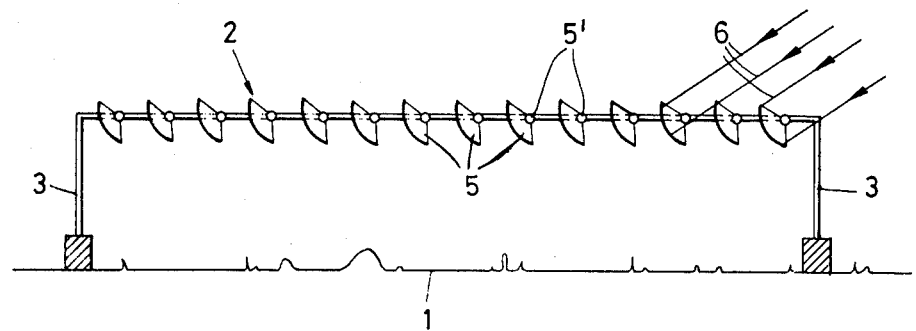
FIG. 1 schematically illustrates in side view part of an installation for cultivating plant cultures, with oblique or angled incident radiation of the sun.
Figure 2:
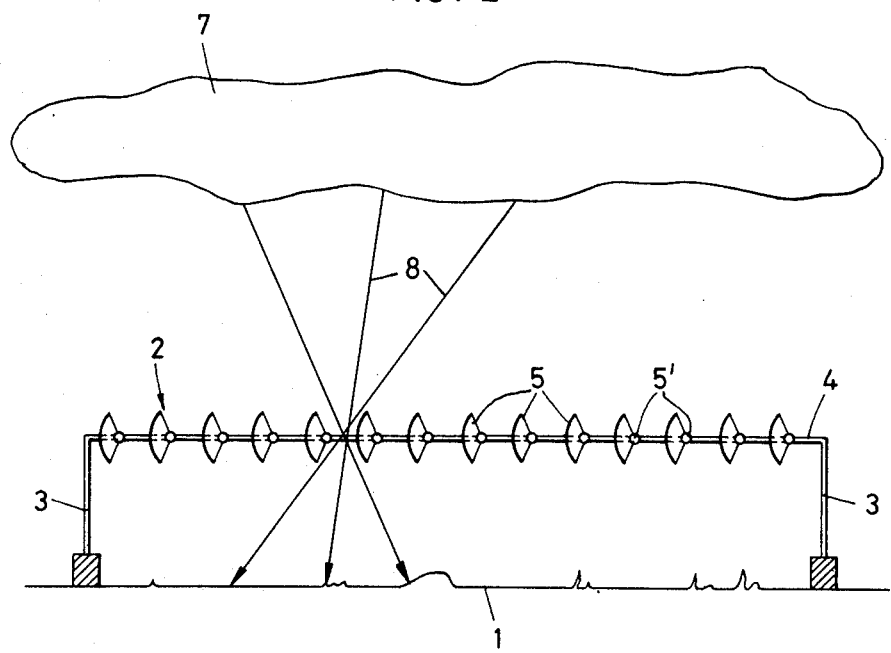
FIG. 2 illustrates the installation shown in FIG. 1 wherein however the sky is clouded and the diffuse radiation reaches the ground and the plants.

Describing now the drawings, a simple construction of installation for cultivating plants has been illustrated in FIGS. 1 and 2. This simplified installation is contemplated to be used both for warm and extremely hot regions or zones. Above the ground surface or ground 1, at which there are planted the plants, there is located a cover device 2 which gives shade. This cover device 2 is supported by a support device 3, 4 embodying vertical supports 3 and horizontal supports 4. The cover device 2, which prevents direct radiation of the plants by the sun during the day, encompasses a number of substantially cylindrical parabolic reflectors 5 which are pivotable about their focal axis and preferably automatically follow the position or altitude of the sun. The spacing between two neighboring reflectors 5, which extend perpendicular to the plane of the drawing of FIG. 1, is chosen such that between the reflectors there only remains a small gap of a few centimeters when these reflectors are focused or aligned with the sun which is located at the zenith.

When the sun is located in a position such that the rays are incident at an angle, as such has been schematically indicated by the arrows 6 in FIG. 1, then no radiation of the sun can reach the ground 1.

On days when the sky is cloudy, as such has been indicated in FIG. 2 by the cloud 7, the reflectors 5 are brought into the position illustrated in FIG. 2, so that the diffuse rays 8 can reach the ground 1 while only slightly hindered by the reflectors 5.

With this simple constructional embodiment of installation, which for instance can be arranged in a hothouse or greenhouse equipped with a glass roof, the aforementioned useful area or surface of the ground 1 is not only shaded, rather the major portion of the solar energy incident at the reflectors 5 is withdrawn, and thus, no longer participates in heating the ground 1. As a result there is obtained a certain cooling action. This action is not present when using shades formed of fabric webs and arranged below the glass roof of a greenhouse, because the shades themselves are intensively heated by the sun's radiation and the absorbed heat is radiated in a secondary form to the useful ground surface or area.

The solar energy which is captured by the reflectors 5 is transmitted to a heat carrier flowing through conduits or pipes 5' arranged along the focal lines of the reflectors, and such energy is then withdrawn.

In hot regions, i.e. in southern regions, this withdrawn solar energy can be used for other purposes, for instance, for producing fresh water from salt water. The obtained fresh water can then be used for spraying the plants to be grown.

FIG. 3 is a simplified illustration of an installation which is suitable for use in temperate and colder regions or zones. The cover device 2 which is supported upon the supports or carriers 3 is arranged beneath a schematically shown roof 9 formed of a light pervious material, such as for instance glass. Also the not particularly illustrated side walls are preferably closed by glass panes, so that the ground 1 is located within a glass housing.

FIG. 4 is a top plan view of part of the cover device 2 which embodies a number of reflectors 5, one of which has been shown in cross-section in FIG. 5. The reflectors 5 are provided at each end with a side wall 10 which in conjunction with the lengthwise extending elements 11, 12 and 13 form a cage 50 in which there are supported a number of parabolic-shaped reflector segments 14. At the outside of each side wall 10 there is rigidly attached to the related side wall a respective gear 15. A conduit or pipe 17 extends along the focal line of the reflector 5 through an opening 16 at the center of the gear 15 and a corresponding opening 10a in the side wall 10 and serves to conduct a heat carrier through the effective region or zone of the reflector. The conduits or pipes 17 of the reflectors 5 are rigidly connected with the supports or carriers 4 and these reflectors are pivotably arranged about the conduits 17. With the embodiment shown in FIG. 4 each such conduit or pipe 17 extends through three reflectors 5. The one end 17a of the first conduit or pipe 17 at the right of FIG. 4 is connected by means of an angle member or bend 18 with a tubular conduit 19 which leads to a suitable heat reservoir or storage which has not been particularly shown in FIG. 4. The other end 17b of the conduit 5 under discussion is connected by means of a substantially U-shaped tubular section or bend 20 with the next conduit 5. Successive conduits 17 are interconnected by such U-shaped bends 20 as shown in FIG. 4. The conduit 5 at the left-hand side of FIG. 4 is connected by means of a further angle member or bend 18 with a tubular conduit or pipe 21 which is connected with the aforementioned heat reservoir or storage. The heat carrier is conveyed through the conduits or pipes 17 and the substantially U-shaped bends or tubular sections 20 along a meander-shaped path through the effective zones or regions of the individual reflectors 5.

By means of the gear racks 22, which can be provided with teeth 23 over their entire length or only over a part of their length, and which mesh with the gears 15, there is obtained a synchronous pivotal movement of all of the reflectors 5, in that further gears 25 which are arranged upon a shaft 24 move the gear racks 22 to the left and to the right, as desired, with respect to the showing of FIGS. 4 and 5. The drive of the shaft 24 is accomplished by means of an adjustment or positioning mechanism 26 embodying a conventional electric motor and transmission.

The adjustment mechanism 26 is controlled by a control device 27 which, among other things, contains a switch 28 having three switch positions for selecting one of three operating modes. In the first position the reflectors 5 are automatically aligned with the position of the sun, and the control device 27 evaluates signals generated by a sensor 29 and which are dependent upon the direction of the reflectors 5 with respect to the sun and correspondingly controls the adjustment mechanism 26. For this purpose, the sensor 29 is attached to one of the reflectors 5 and therefore carries out the same pivotal movements (FIG. 1). In the second operating position of the switch 28 the adjustment mechanism 26 has delivered thereto a signal which causes all of the reflectors 5 to be downwardly directed, as best seen by referring to FIG. 3. In the third operating position of the switch 28, the adjustment mechanism 26 has delivered thereto a signal which aligns or focuses the reflectors 5 in the manner illustrated in FIG. 2.

Figure 8:
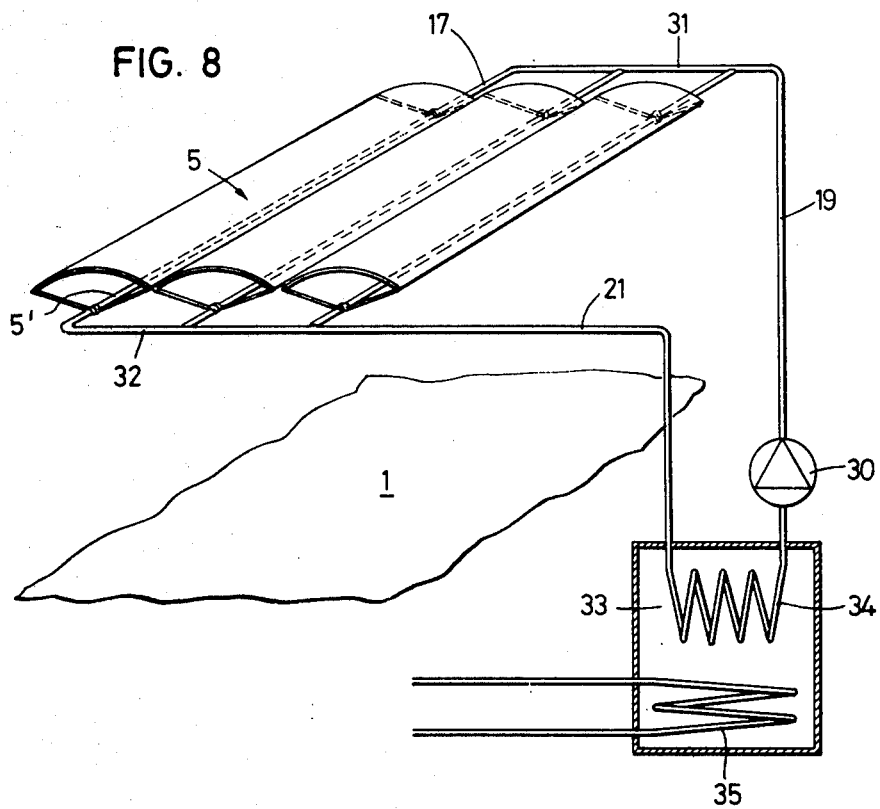
FIG. 8 schematically illustrates part of the installation portrayed in FIG. 1.

Continuing, FIG. 8 schematically illustrates the most important parts of the above-described installation. In this exemplary embodiment the conduits or pipes 17 of the individual reflectors 5 are connected in parallel with one another. The preferably liquid heat carrier is delivered by means of a conveyor or feed pump 30 via the tubular conduit or line 19 and a distributor line or conduit arrangement 31 to the conduits or pipes 17. The heat carrier is furthermore collected by means of a collector conduit or pipe arrangement 32 and delivered via the tubular conduit or pipe 21 to a heat exchanger 34 arranged in a heat reservoir or storage 33 and is conveyed back from the heat exchanger 34 to the conveyor or feed pump 30.

If, as schematically indicated in FIG. 1, the reflectors 5 are aligned during the day in accordance with the postion of the sun, then the ground 1 at which the plants are being grown is shaded. The sun's rays or radiation is not only prevented from reaching the plants, rather by means of the solar energy the heat carrier flowing through the conduits 17 is heated and the absorbed thermal energy or heat is delivered by means of the heat exchanger 34 to the heat storage or reservior 33. During the nighttime the switch 28 of the control device 27 is located in the second operating position, so that the reflectors 5, as illustrated in FIG. 8, are downwardly directed. In this operating state the heat storage 33 delivers thermal energy to the heat carrier by means of the heat exchanger 34 and the heat given-off by the conduits 17 is radiated by means of the reflectors 5 to the ground or ground surface 1 where the plants are being grown.

In the event that during those days where there is very little sunshine and insufficient thermal energy has been stored at the heat storage or reservoir 33, then additional heat can be delivered to the heat storage 33 by means of a further heat exchanger 35. This additional heat can be produced by electrical energy or the use of a suitable fuel. In order to obtain as good as possible thermal insulation in the upward direction, during which time the reflectors 5 are downwardly directed, it is advantageous to provide the rear surface or face of the reflectors 36, which have been illustrated in FIGS. 6 and 7, with a heat insulation layer 37. In the case of installations which are intended to be used in extremely hot regions or zones, it is sufficient if the reflector segment 38 of the reflectors 37, viewed in cross-section, are curved or arc-shaped.

Figure 7:
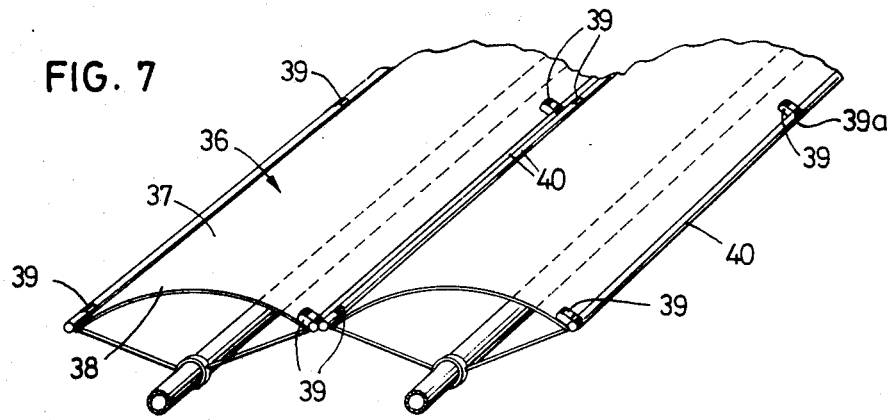
FIG. 7 is a perspective view of part of the reflector arrangement shown in FIG. 6.

Flat eyelets 39 or equivalent structure are attached at a uniform spacing from one another along the lengthwise edges of the reflectors 36, as best seen by referring to FIG. 7. A rod 40, preferably formed of plastic, piercingly extends through the mutually aligned eyelets 39. The openings 39a of the eyelets 39 extend tangentially to the substantially arc-shaped reflector segments 38 and the associated insulational layer 37. The rods 40 serve to close the gaps between two neighboring reflectors 36 when such reflectors assume the position illustrated in FIGS. 6 and 7. Consequently, very little heat is radiated upwardly.

If the reflectors 36 are rocked, for instance at midday, through 180° relative to the position illustrated in FIGS. 6 and 7 then the eyelets 39 are inclined in the other direction and the rods 40 are located at the other end of the eyelet openings 39a, whereby these rods free the aforementioned gaps or spaces between two neighboring reflectors 36, in order to provide the so-called "short days". The ground 1 is then only radiated in strips through these gaps, and the strips radiated by the sunlight migrate with the position of the sun. The length of the "short day" is dependent upon the width of the gaps.

On days during which the sky is cloudy and accordingly the sun's rays do not fall upon the installation, the switch 28 of the control device 27 is rotated into the third operating position. As a result, the reflectors 15 are rocked into the position illustrated in FIG. 2, so that the diffuse radiation 8 can directly strike the ground 1 almost without any hindrance. It should be apparent that during this operating position no thermal energy is taken-up or absorbed by the reflectors 5, but also no heat or thermal energy is transmitted to the ground 1. Therefore, in this operating position the feed or conveyor pump 30 is turned-off, and switching-on and switching-off of the pump 30 is accomplished from the control device 27 by means of the line 41.

Further advantages of the above-described installation will be considered hereinafter. Due to the selection of cylindrical parabolic reflectors 5 there is achieved the possibility of withdrawing the incident solar energy at a relatively high temperature with the aid of the heat carrier. Consequently, the dimensions of the heat reservoir or storage can be reduced and there can be retained or utilized conventional heating systems. Equally, owing to the high temperature level, especially with operation in southern situated regions, there can be used absorption-refrigerating machines or refrigerators in order to reduce the temperature, for instance in the greenhouse or glass house. Furthermore, it is conceivable in regions where there is not available any fresh water to operate water desalination installations with the thermal energy absorbed by the reflectors.

The reflectors are utilized in a three-fold aspect: firstly, they serve to throw shade upon the useful ground surface 1, secondly, for absorbing or taking-up the solar energy so that such can be stored, and thirdly, for irradiating the ground 1 with infrared radiation during the nighttime.

The above-described installation, owing to its simple construction and the simple manner of fabricating the same, requires only a relatively small expenditure in material and economical utilization of the installation is especially possible because the solar energy is not merely prevented from reaching the useful ground surface or area, rather is additionally utilized. Due to the multiple utilization of the above-described cover device with the reflectors 5 there are attained further economical advantages due to the saving in the costs of conventional equipment, such as cooling devices, shade devices, heating systems and thermal insulation. Since these devices and expedients are no longer needed the somewhat greater price for the herein described cover device is more than compensated.

If the reflectors are arranged within a greenhouse, then they are protected against the effects of wind and therefore can be fabricated of light weight construction and accordingly at a low price.

While there are shown and described present preferred embodiments of the invention, it is to be distinctly understood that the invention is not limited thereto, but may be otherwise variously embodied and practiced within the scope of the following claims. Accordingly,

What we claim is:

1. An installation for cultivating plants and the like comprising:
   a cover device for protecting the ground at which the plants are grown from damaging radiation of the sun;
   a support device for supporting the cover device;
   said cover device comprising a number of pivotable, substantially cylindrical parabolic reflectors each having a focal line;
   a respective conduit provided along the focal line of each parabolic reflector for conveying a heat carrier;
   an adjustment mechanism for pivoting the reflectors about their lengthwise axis;
   a circulation system for circulating the heat carrier;
   said circulation system encompassing a feed pump and said conduits;
   a control device for actuating said adjustment mechanism;
   said control device being constucted such that when the sun is shining the reflectors are automatically positionally adjusted in accordance with the position of the sun and simultaneously throw shade upon the ground and the solar energy taken-up by the reflectors is removed;
   a heat storage for the storage of the removed heat;
   said control device having means controlling said circulation system in the absence of the sun's radiation such that said reflectors are aligned with respect to the ground such that heat is radiated from the heat storage to the ground.

2. The installation as defined in claim 1, wherein:
   said control device includes means for selecting the automatic positional adjustment of the reflectors towards the sun, the alignment of the reflectors at the ground, or placement of the reflectors in a position where such reflectors provide the least hindrance of penetration of diffuse radiation of the sun.

3. The installation as defined in claim 1, further including:
   a light pervious-roof means arranged over said reflectors.

4. The installation as defined in claim 3, further including:
   wall means for completely closing-off the ground with respect to the outside.

5. The installation as defined in claim 1, wherein:
   each of the reflectors has a rear face covered with a heat insulating layer.

6. The installation as defined in claim 1, wherein:
   said reflectors are arranged such that a gap is present between each two neighboring reflectors;
   means for covering the gap between each two neighboring reflectors;
   said gap covering means closing said gaps under the action of the force of gravity when the reflectors are directed towards the ground and freeing said gaps when the reflectors are upwardly directed.

7. A greenhouse installation for cultivating plants and the like comprising:
   cover means for protecting a cultivating medium in which the plants are grown from damaging radiation of the sun, said cover means comprising a plurality of arcuate solar reflectors each having a focal line;
   means for pivoting each reflector about an axis parallel to its focal line;
   conduit means arranged along the focal line of each reflector for collecting solar energy in a heat carrier conveyed therethrough;
   circulation means connected to said conduit means for circulating the heat carrier through said conduit means and for storing collected solar energy; and
   means for controlling said circulation means and pivoting means to selectively position said reflectors (1) toward the sun in the presence of direct radiation from the sun such that solar energy is collected and stored as heat and the cultivating medium is shaded by said reflectors and (2) toward the cultivating medium in the absence of radiation from the sun such that the stored heat is radiated to the cultivating medium.

8. The installation as defined in claim 7, wherein said control means is further operative to selectively postion said reflectors to admit maximum light therebetween in the presence of diffuse solar radiation.

9. The installation as defined in claim 7, wherein said pivoting means includes a rack and gears engageable therewith, each gear being rigidly affixed to a respective reflector, said conduit means extending rotatably through said gear.

* * * * *